July 21, 1964   W. A. LLOYD ET AL   3,141,986
HIGH VACUUM SPUTTER-ION GETTERING APPARATUS
Filed Sept. 18, 1961
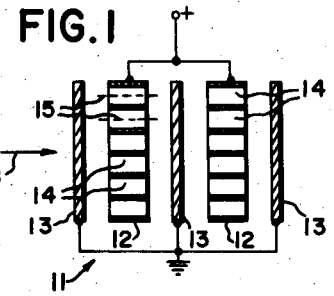
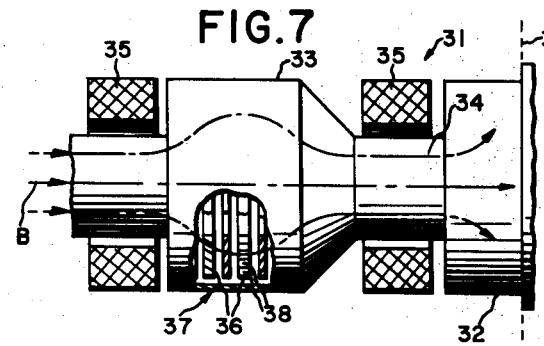
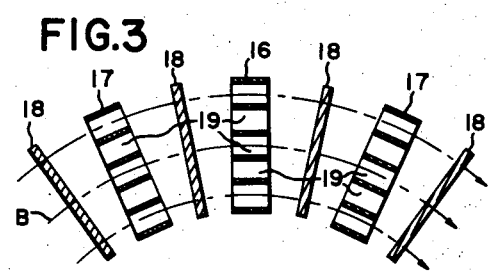
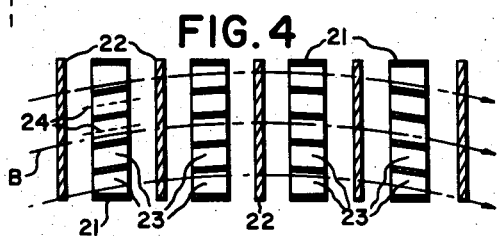
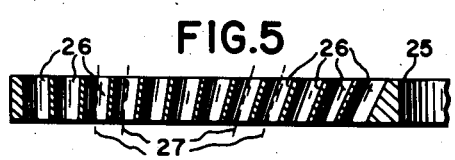
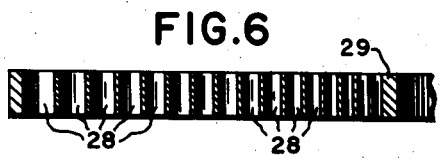
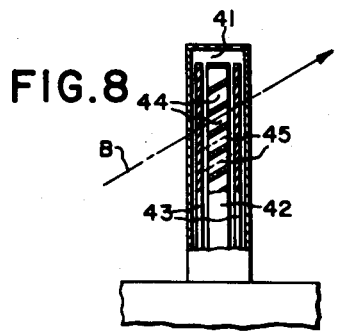
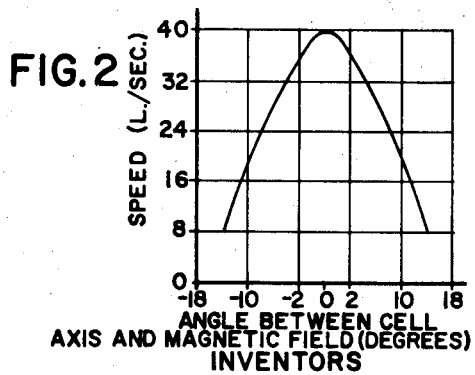
INVENTORS
WILLIAM A. LLOYD
SHERMAN L. RUTHERFORD
BY
ATTORNEY _United States Patent Office_

3,141,986
Patented July 21, 1964

3,141,986
HIGH VACUUM SPUTTER-ION GETTERING APPARATUS
William A. Lloyd, Sunnyvale, and Sherman L. Rutherford, Palo Alto, Calif., assignors to Varian Associates, Palo Alto, Calif., a corporation of California
Filed Sept. 18, 1961, Ser. No. 138,675
19 Claims. (Cl. 313—7)

This invention relates to high vacuum sputter-ion apparatus and has specific utility for sputter-ion apparatus which utilize curved magnetic fields.

Prior sputter-ion devices, such as vacuum pumps and gauges, have for the most part been composed of cellular anode electrodes straddled by parallel positioned reactive cathode electrodes as described in U.S. Patent No. 2,993,638, issued to Lewis D. Hall, John C. Helmer and Robert L. Jepsen on July 25, 1961. Optimum performance in these sputter-ion devices is obtained when the axes of the cells of the cellular anode are aligned with the applied magnetic field. Small misalignments result in large reductions in pumping speed. Therefore, prior devices have comprised one or more cellular anode arrays each having a plurality of parallel cells arranged in planes perpendicular to an applied rectilinear magnetic field. It has also been established that a sputter-ion device will exhibit an optimum pumping performance for a particular value of $Bd$ product where $d$ is the diameter of the individual anode cell cross section and $B$ is the magnitude of applied magnetic field. Accordingly, prior sputter-ion devices were made with all the anode cells of uniform size in order to produce optimum pumping for an applied uniform magnetic field.

However, in many cases it is desirable to utilize sputter-ion electrode elements with magnetic fields which are curved and/or non-uniform. For example, sputter-ion pumping elements are frequently inserted into the vacuum chambers of high vacuum apparatus which operate in a magnetic field. In some of these cases it is desirable and economical to utilize the magnetic fields already existing in the high vacuum apparatus rather than providing a separate source of magnetic field for the sputter-ion pump elements. However, the existing field in the area available for the pump elements may be, for example, a fringing field which is non-uniform and/or curved. To utilize the conventional uniform size parallel anode cell arrangement in such a field will provide less than optimum performance.

It is, therefore, the object of the present invention to improve the performance of sputter-ion devices which utilize curved and/or non-uniform magnetic fields.

One feature of the present invention is the provision of a sputter-ion device having nonparallel gas discharge paths.

Another feature of the present invention is the provision of a plane cellular anode electrode in which the axis of the individual cells are nonperpendicular to the plane of the anode electrode.

Still another feature of the present invention is the provision in a sputter-ion device of a plurality of nonparallel plane anode electrodes, each aligned perpendicular to the local magnetic field, and wherein each pair of plane anode electrodes is separated by a cathode electrode which bisects the angle between the separated anode electrodes.

Other features and advantages of the present invention will become apparent upon a perusal of the specification taken in connection with the accompanying drawings wherein, FIG. 1 is a cross-sectional view through a conventional sputter-ion electrode element array, FIG. 2 is a diagram showing the effect on sputter-ion operating performance which results from variations in the angle between anode cell central axes and applied magnetic field, FIG. 3 is a cross-sectional view through one sputter-ion electrode array embodiment of the present invention, FIG. 4 is a cross-sectional view taken through another sputter-ion electrode element array embodiment of the present invention, FIG. 5 is an enlarged cross section taken through one sputter-ion anode electrode embodiment of the present invention, FIG. 6 is a cross-sectional view taken through another sputter-ion anode electrode embodiment of the present invention, FIG. 7 is a partial front view partly in cross section of a novel hydrogen fusion device utilizing the sputter-ion electrode array of FIG. 3, and FIG. 8 is a partial view partly in cross section of another embodiment of the present invention.

Referring now to FIG. 1, there is shown a conventional anode-cathode element array 11 typically used in sputter-ion devices. A plurality of plane anode electrodes 12 are each straddled by and spaced parallel to reactive cathode plates 13. Each of the plane anode electrodes 12 has a plurality of openings therein which form open ended cells 14 and provide gas discharge paths between the cathode plates 13. The open ends of the anode cells 14 lie in planes parallel to the reactive cathode plates 13. A uniform rectilinear magnetic field B is applied perpendicular to the plane of the anode electrodes 16. Each of the anode cells 14 has a central axis 15 which passes through the centers of its open ends and is perpendicular to the plane of the anode electrodes 16. Thus, all of the gas discharge paths are parallel to each other and to the applied magnetic field B providing for optimum operation. Also, since the magnitude of applied magnetic field B is uniform all of the anode cells 14 are of the same size so as to provide an optimum $Bd$ product.

In typical operation of the sputter-ion element shown in FIG. 1, the anode and cathode electrodes 12, 13 and an enclosing vacuum envelope (not shown) would be connected for gas communication with a vacuum chamber (not shown) to be evacuated. A positive potential would be applied to the anode electrodes 12 to establish a potential difference between them and the grounded cathode electrodes 13. The combined effect of this potential difference and the applied magnetic field 13 would then result in a plurality of gas discharges which pass through the anode cells 14 between the cathode plates 13. The well-known pumping effect produced by the gas discharges would then serve to evacuate the attached vacuum chamber (not shown). However, in many cases it is desirable to operate a sputter-ion device in an existing magnetic field which is curved and/or non-uniform. In this case, the conventional sputter-ion element electrode array shown in FIG. 1 would provide less than optimum performance.

FIG. 2 is a diagram illustrating the importance of aligning the central axes of sputter-ion anode electrode cells with the applied magnetic field. Pumping speed in liters per second is plotted versus angle between anode cell central axes and applied magnetic field line in degrees. The data plotted in FIG. 2 were obtained from the operation of a sputter-ion vacuum pump having an anode-cathode array such as that shown in FIG. 1. Pumping speed was measured with an anode voltage of 6 kv. and a magnetic field of 3750 gauss applied at various angles with the central axes of the circular cylinder anode cells which had diameters of 0.350 inch. As shown, a pumping speed of about 40 liters per second was obtained with the magnetic field applied parallel to the anode cell axes. However, the pumping speed fell rapidly as the angle between anode cell axes and magnetic field was increased reaching a value of only about 8 liters per second with an angle of ±14 degrees.

FIG. 3 shows one embodiment of the present invention for obtaining optimum performance in a curved magnetic field B. The conventional cellular anode electrodes 16, 17 and reactive cathode plates 18 are arranged in a radial array along the curved path of the magnetic field B so that the central axis through the open ends of each individual cell 19, and therefore the gas discharge path defined thereby, are parallel to the applied magnetic field. As shown, this radial arrangement provides a device in which the central cell axes and gas discharge paths of one anode electrode 16 are not parallel to those of succeeding or adjacent anode electrodes 17. However, by maintaining parallelism between the gas discharge paths and the applied magnetic field B, optimum performance is insured.

Although in the past it has been suspected that optimum sputter-ion device performance required that the reactive cathode electrodes be parallel to the adjacent plane anode electrodes, and thus perpendicular to the gas discharge paths, it has been found that the array of FIG. 3 in which the individual cathode electrodes 18 bisect the angle between adjacent anode electrodes 16, 17 produces substantially optimum performance. Thus, the radial array of FIG. 3 provides near optimum performance with only a single cathode electrode 18 between each pair of anode electrodes 16, 17 rather than the two cathode electrodes which would be required between each pair of anode electrodes in order to establish parallelism therebetween.

FIG. 4 shows another embodiment of the present invention in which a plurality of plane cellular anode electrodes 21 and reactive cathode plate electrodes 22 are alternately positioned in a spaced array. A curved magnetic field B is applied between the parallel positioned anode and cathode electrodes 21 and 22. The individual cells 23 in the anode electrodes 21 are made, for example, by drilling or punching, so that the central axes 24 through the open ends of the individual cells 23 make various angles with the planes of the anode cells open ends. Thus, the individual cell axes 24 and therefore the gas discharge paths defined thereby are not all parallel to each other but are locally parallel to the applied curved magnetic field B providing a sputter-ion electrode element array which produecs optimum performance with the curved magnetic field.

FIG. 5 shows an individual sputter-ion plane anode electrode 25 which could be used to provide optimum performance with an applied magnetic field having lines of force which make various angles with the plane of the anode electrode 25. The plane cellular anode electrode 25 has individual open-ended cells 26 whose central axes 27 form varying angles with the plane of the anode cells open ends.

FIG. 6 shows another anode electrode embodiment of the present invention which can be used to provide optimum performance with a non-uniform rectilinear magnetic field applied perpendicular to the plane of the anode electrode. The individual cells 28 of the plane cellular anode electrode 29 are of various sizes to compensate for the non-uniform applied magnetic field. The sizes of the individual cells are chosen so as to provide a substantially constant $Bd$ product for all anode cells where $d$ is the diameter of the largest circle which can be transcribed in a transverse cross section through an individual anode cell and B is the magnitude of magnetic field applied through the anode cell.

FIG. 7 shows part of a hydrogen fusion device 31 which is symmetrical about the dotted line 30 and which utilizes the sputter-ion electrode element array of FIG. 3. A large vacuum chamber 32 communicates with the sputter-ion pump envelope 33 through a connecting tubulation 34. The pump envelope 33 is straddled by annular electrical windings 35 which provide a magnetic field B passing through the annular windings 35 into the vacuum chamber 32. As shown, the magnetic field B flares outwardly in the pump envelope region lying between the electrical windings 35. The plane anode electrodes 36 in the annular anode-cathode array 37 positioned within pump envelope 33 are therefore provided with individual anode cells 38 each aligned with the applied curved magnetic field B. In this way, optimum pumping performance is obtained with the anode-cathode array 37 while utilizing the existing curved magnetic field.

Although the sputter-ion embodiments shown in FIGS. 3 through 6 have been described for utility with a curved and/or non-uniform magnetic field, FIG. 8 illustrates an application where the anode embodiment of FIG. 6 would be useful with a uniform rectilinear magnetic field. In certain vacuum applications, the only, or at least the most convenient, space available to accommodate a sputter-ion electrode assembly might be a relatively narrow flat space 41 with an existing magnetic field B directed other than perpendicular to the plane of the space. In this case, a plane cellular anode electrode 42 lying in the plane of the available space 41 and straddled by cathode plate 43 would be a convenient arrangement. However, each of the individual anode cells 44 would be arranged with central axes 45 nonperpendicular to the anode electrode plane and parallel to the applied rectilinear magnetic field B. This would allow optimum performance of the sputter-ion electrodes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A sputter-ion apparatus comprising a vacuum envelope, and anode electrode, a cathode electrode, said anode and cathode electrodes providing a plurality of gas discharge paths within said vacuum envelope, and wherein at least two of said gas discharge paths are nonparallel.

2. The apparatus according to claim 1 including means for providing a non-uniform magnetic field between said anode and cathode electrodes.

3. The apparatus according to claim 1 including means for providing a potential difference between said anode and cathode electrodes.

4. The apparatus according to claim 1 wherein said anode electrode comprises a flat plate, said anode plate having a plurality of openings therein, said openings defining said gas discharge paths, and at least one of said openings having a central axis which is nonperpendicular to the plane of said anode plate.

5. The apparatus according to claim 4 including means for providing an non-uniform magnetic field between said anode and cathode electrodes.

6. The apparatus according to claim 4 wherein at least two of said openings are of different sizes.

7. The apparatus according to claim 6 including means for providing a non-uniform magnetic field between said anode and cathode electrodes.

8. The apparatus according to claim 1 wherein said anode electrode comprises a plurality of flat plates, said cathode electrode comprises a plurality of flat plates, each of said anode and cathode plates being parallel to each other, and wherein one of said cathode plates is positioned on each side and spaced from each of said anode plates.

9. The apparatus according to claim 8 including means for providing a non-uniform magnetic field between said anode and cathode plates.

10. The apparatus according to claim 8 wherein each of said anode plates has at least one opening therein, said openings defining said gas discharge paths, and at least one of said openings having a central axis which is nonperpendicular to the plane of the plate in which it is located.

11. The apparatus according to claim 10 including means for providing a non-uniform magnetic field between said anode and cathode plates.

12. The apparatus according to claim 10 wherein at least two of said openings are of different sizes.

13. The apparatus according to claim 12 including means for providing a non-uniform magnetic field between said anode and cathode plates.

14. The apparatus according to claim 1 wherein said anode electrode comprises a plurality of flat plates, said cathode electrode comprises a plurality of flat plates, one of said cathode plates positioned on each side and spaced from each said anode plate, and wherein at least two of said anode plates are nonparallel.

15. The apparatus according to claim 14 including means for providing a non-uniform magnetic field between said anode and cathode plates.

16. The apparatus according to claim 14 wherein the cathode plate positioned between said nonparallel anode plates substantially bisects the angle formed by said nonparallel anode plates.

17. The apparatus according to claim 16 including means for providing a non-uniform magnetic field between said anode and cathode plates.

18. A sputter-ion anode electrode having a plurality of open-ended cells, one open end of each of said cells lying in the same plane, and the central axes of said cells through the center of said open ends being nonperpendicular to the plane of said open ends.

19. The sputter-ion anode electrode according to claim 18 wherein said central axes of at least two of said cells are nonparallel.

References Cited in the file of this patent
UNITED STATES PATENTS
2,993,638     Hall et al. _____ July 25, 1961